United States Patent [19]
Bonke

[11] Patent Number: 4,899,351
[45] Date of Patent: Feb. 6, 1990

[54] TRANSIENT FREE CLOCK SWITCH LOGIC

[75] Inventor: Carl Bonke, Rancho Santa Margarita, Calif.

[73] Assignee: Western Digital Corporation, Irvine, Calif.

[21] Appl. No.: 220,534

[22] Filed: Jul. 18, 1988

[51] Int. Cl.[4] .............................................. H04L 7/00
[52] U.S. Cl. .................................... 375/108; 307/269; 371/61
[58] Field of Search ....................... 375/106, 107, 108; 307/219, 480, 269; 371/61; 328/63, 72, 104

[56] References Cited

U.S. PATENT DOCUMENTS

| | | | |
|---|---|---|---|
| 4,229,699 | 10/1980 | Frissell | 375/108 |
| 4,322,580 | 3/1982 | Khan et al. | 371/61 |
| 4,412,342 | 10/1983 | Khan et al. | 307/219 |
| 4,538,272 | 8/1985 | Edwards et al. | 371/61 |
| 4,651,103 | 3/1987 | Grimes | 375/108 |
| 4,677,499 | 6/1987 | Shirota et al. | 371/61 |

Primary Examiner—Benedict V. Safourek
Assistant Examiner—Stephen Chin
Attorney, Agent, or Firm—Christie, Parker & Hale

[57] ABSTRACT

The invention provides a circuit for selecting a first clock, disabling a second or additional clocks and positively enabling the selected first clock only after the second or additional clocks no longer provide signal to the circuit.

6 Claims, 6 Drawing Sheets

TRANSIENT FREE CLOCK SWITCH LOGIC

This invention relates generally to control for switching between two or more clocks for logic circuit operation. More particularly, the invention provides a circuit for selecting a first clock, disabling a second or any additional clocks, and positively enabling the selected first clock only after the second or additional clocks are no longer providing signal to the circuit, thereby providing a transient free switch between clocks.

BACKGROUND OF THE INVENTION

Operation of logic circuits for computer and peripheral devices often requires the use of two or more clocks. Often a single logic circuit is interfaced to two or more other circuits or devices operating at different clock frequencies. Synchronous operation of the logic circuit with the interfaced circuits is often required. Therefore, clocking for the logic circuit must be switched to the clock frequency of the interfaced circuit requiring synchronous operation.

The switching between clocks of varying frequency or phase often results in transients in clocking of the logic circuit. These transients may be induced by mixing of two or more clock signals or by a simultaneous enablement or disablement of the various clocks. Due to the presence of delay and settling time in the elements of the logic circuit itself, such transients may induce errors or indeterminant states in the logic circuit. Recent prior art circuits for clock switching have provided synchronization for enablement and disablement of the various clocks. Such a prior art circuit is shown in FIG. 1.

In the prior art shown a selection signal for the clock was synchronized through strings of two or more serially connected D-type flip-flops. Each string is clocked by one clock. The output from these flip-flops is connected to an AND gate with the selected clock to provide an enabled clock output. Disabling of the clock not selected is accomplished by extracting the intermediate output of the serial flip-flops and tying that signal into the AND gate with the clock. Enablement of the clock is thereby synchronized to the second clock pulse after selection while disablement of the clock is synchronized to the first clock pulse after selection. Outputs of the AND gates for enabled or disabled clocks are connected through an OR gate to provide the selected clock to the logic circuit.

While the example prior art device does provide synchronization of the enable and disable signals with each individual clock, it is possible for a clock of lower frequency to remain enabled while a higher frequency clock also becomes enabled, thus causing a transient pulse on the output. Providing additional serial flip-flops in the synchronizer for the higher frequency clock may eliminate this transient behavior. However, clock switching times are then limited to the worst case timing imposed by the pulse duration of the low frequency clock. In the prior art example shown, clock 1 is the higher frequency clock and therefore requires a three flip-flop synchronizer. Clock 2, the lower frequency clock, requires two serial flip-flops for synchronization.

A disparity in clock frequency of a factor of 5 or greater is not uncommon in current computer and peripheral design. This disparity would result in strings of 5 or 6 serial flip-flops for enabling the foster clock in the prior art example.

Additionally, in many applications the absence of one of the clock signals may be likely. The sensing of the presence of the enabled clock is necessary for automatic or program controlled response to the lack of a selected clock. The example prior art circuit does not provide this capability.

SUMMARY OF THE INVENTION

The invention provides a logic circuit for selecting one of two clocks to provide synchronous operation of interfacing logic circuitry. A means for selecting the desired clock creates a selection signal output. Individual means for synchronizing the selection signal with each of the clocks are employed to propagate the selection signal. A lock-out circuit is also provided for each clock which receives the selection signal from the synchronizer. An additional enabling signal input to each lock-out circuit is provided by an associated delay circuit connected to the second lock-out circuit and synchronously responsive to the second clock. Each lock-out circuit will enable its associated clock only if the selection signal indicates the associated clock, the clock signal itself is present, and the output from the associated delay circuit indicates that the alternate clock is disabled.

The output of the selected clock lock-out and the disabled clock lock-out are received by a sensor means to detect actual operation of the selected clock, thereby allowing automatic or programmable response should the selected clock be inoperative. The previously selected clock remains active to provide device clocking.

DETAILED DESCRIPTION OF THE INVENTION

Figure 1:
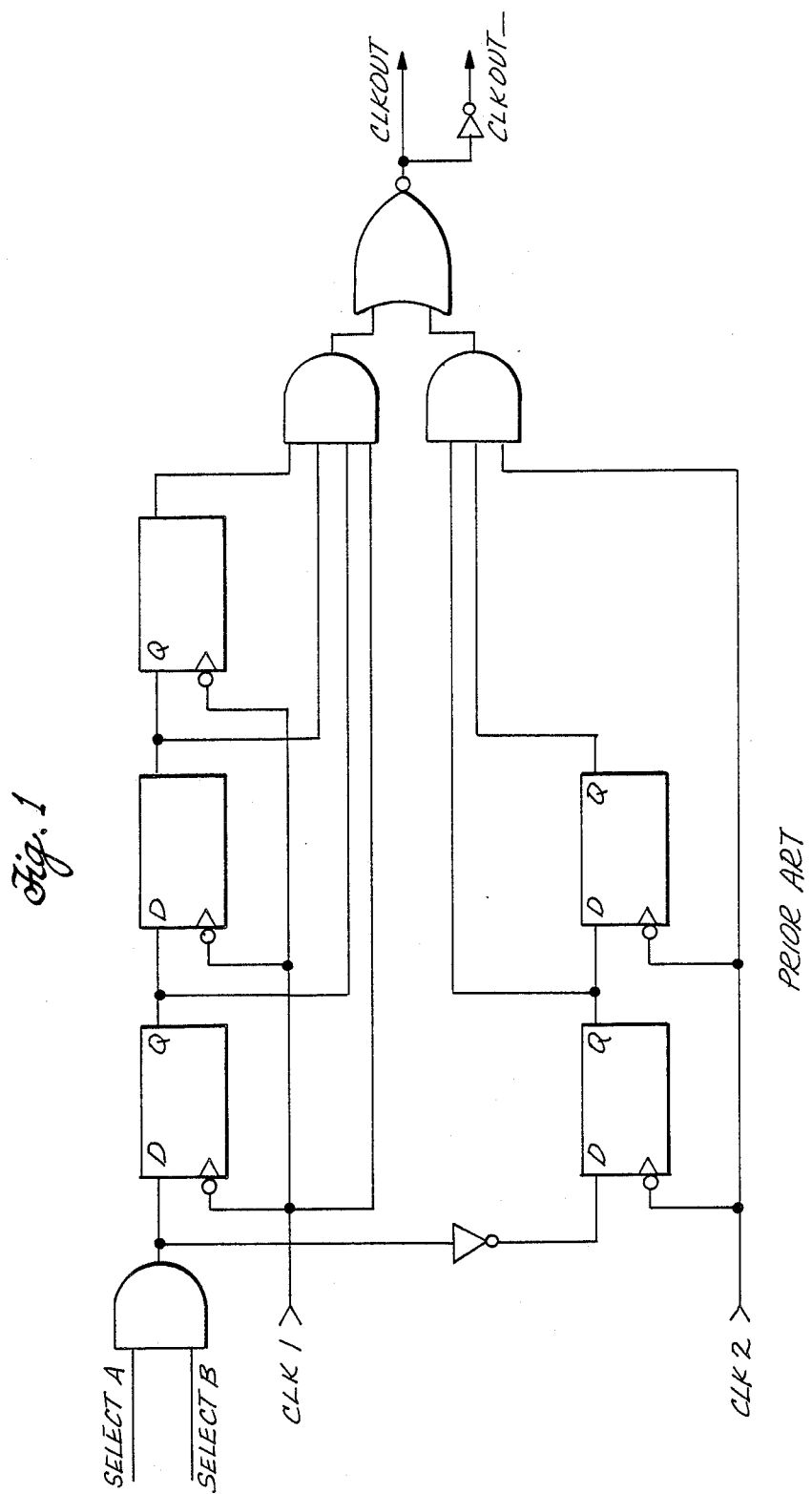
FIG. 1 is a logic diagram of a recent prior art example for a clock enabling and switching circuit.
Figure 2:
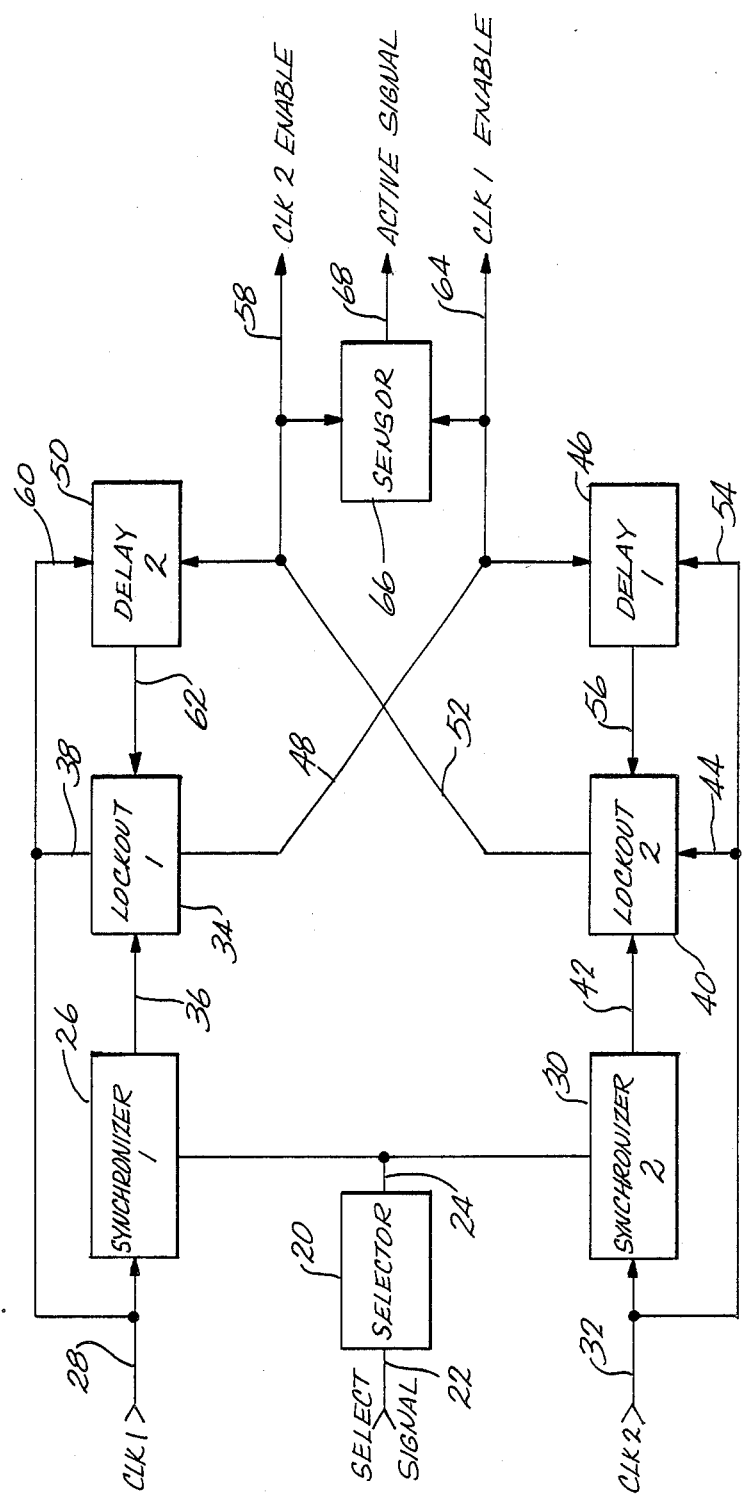
FIG. 2 is a block diagram showing the interrelationship of the sub-circuits of the present invention.

The block diagram shown in FIG. 2 demonstrates the interrelationship of the sub-circuits of the present invention. The embodiment shown provides for the selection between two clocks. However, it is understood that the invention is applicable for use in switching between a plurality of clocks. A selector means 20 receives the clock select signal on input 22. In the embodiment shown selection between the first clock or second clock may be accomplished using a single bit input with 0 representing clock one and 1 representing clock two. The selection signal output 24 is connected to a first synchronizer 26. The signal from the first clock, CLK1, is received on input 28. The selection signal output is also received by a second synchronizer 30. The signal from the second clock CLK2 is received on input 32. A first lock-out circuit 34 receives the selection signal synchronized to clock one on input 36. CLK1 is also received by the first lock-out circuit on input 38. Similarly, the selection signal synchronized to clock two is received by a second lock-out circuit 40 at input 42. CLK2 is received by the second lock-out on input 44.

A first delay circuit 46 is connected to the first lock-out circuit at output 48 and a second delay circuit 50 is connected to the second lock-out at output 52. The first delay circuit will synchronize the output of the first lock-out circuit to the second clock which is connected at input 54. If clock one is not selected, the output of the first lock-out circuit reflects a disabled condition. The clock one disable signal synchronized by the first delay circuit to CLK2 creates an enable signal on input 56 to the second lock-out circuit. The second lock-out circuit responsive to the clock two selection signal on input 42 and the enable signal on input 56 transmits the clock two signal present on input 44 to the output 52, thereby providing the clock two enable signal to connection 58.

Similarly if clock one is selected the signal at output 52 of the second lock-out circuit will reflect the clock two disable condition. The second delay circuit synchronizes the disable signal from output 52 with the CLK1 signal present at input 60. That synchronized signal results in an enable signal to the first lock-out circuit responsive to the enable signal on input 62 and the clock one selection signal on input 36. The first lock-out circuit will transmit the first clock signal present at input 38 to the output 48 for connection to the logic circuit requiring a clock signal at connector 64.

A sensor 66 receives the signals on outputs 48 and 52 to determine the clock currently being transmitted and provides an active signal on output 68.

Figure 3:
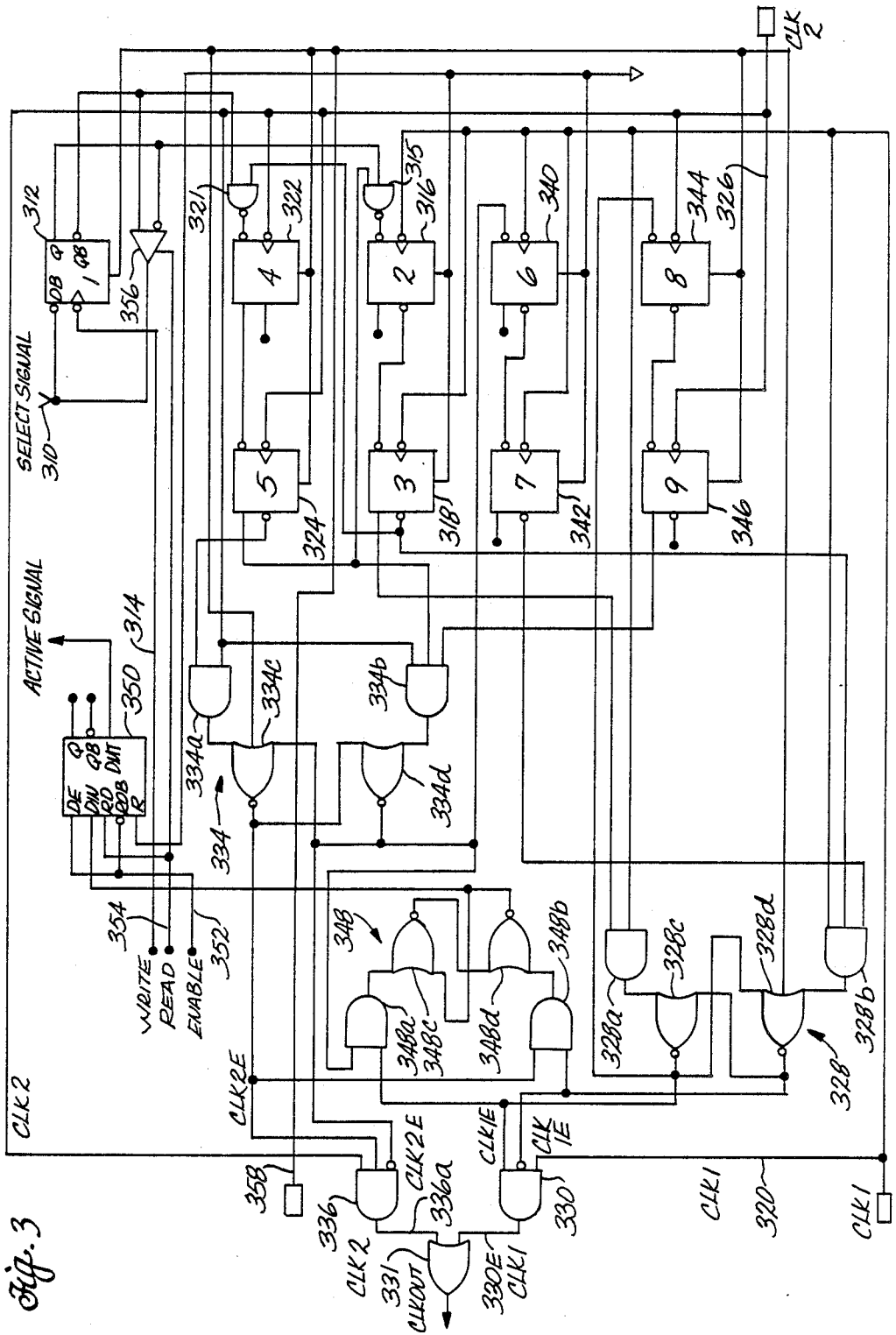
FIG. 3 is a schematic logic diagram of the present invention.

A preferred embodiment implementing the invention is shown in FIG. 3. The SELECT signal present on input 310 is captured by a first flip-flop 312 in response to a WRITE strobe on input 314. The output of the first flip-flop passes through a first NAND gate 315, whose function will be explained subsequently, and is synchronized through a second flip-flop 316 and a third flip-flop 318 which are clocked by the signal from the first clock, CLK1 present at input 320. The inverted output of the first flip-flop passes through a second NAND gate 321, whose function will be explained subsequently, and is synchronized using fourth flip-flop 322 and fifth flip-flop 324 which are clocked using the signal from the second clock, CLK2, present at input 320.

NAND gate 315 qualifies the selection signal from the first flip-flop to the second flip-flop with the normal output of the fifth flip-flop. If clock two is not present during a switch from clock one to clock two, the fourth and fifth flip-flops will not change state. Therefore, the NAND gate 315 will continue to provide a select signal to the second flip-flop.

Similarly, NAND gate 321 qualifies the inverted selection signal from the first flip-flop to the fourth flip-flop with the inverted output of the third flip-flop. If clock one is not present during a switch from clock two to clock one, the second and third flip-flops will not change state, and NAND gate 321 will continue to provide a select signal to the fourth flip-flop. Exclusion of NAND gates 315 and 321 from the circuit and reversing normal and inverted outputs on the second and fourth flip-flops will provide an embodiment of the invention wherein no clock output will be provided if the selected clock is not present.

The selection signal synchronized to the first clock is then provided to a NOR flip-flop 328. The output of the third flip-flop is provided to an AND gate 330 and the inverting output of the third flip-flop is provided to a second AND gate 328b. CLK1 is also connected to the first AND gate and second AND gate. The first AND gate drives a first NOR gate 328c while the second AND gate drives a second NOR gate 328d. An enabling signal whose origin will be discussed subsequently is also provided to the second AND gate. The output of the first NOR gate is crosscoupled to the input of the second NOR gate and similarly the output of the second NOR gate is crosscoupled to the input of the first NOR gate. The first and second NOR gates drive the normal and inverting input respectively of a third AND gate 330 to enable the CLK1 signal to be transmitted on output 330a. The CLK1 signal is transmitted as the clock output CLKOUT through OR gate 331.

Similarly the inverted selection signal synchronized to the second clock is provided to a second NOR flip-flop 334. The output of the fourth flip-flop is provided to a fourth AND gate 334a while the inverting output of the fourth flip-flop is provided to a fifth AND gate 334b. The CLK2 signal is also provided to the fourth and fifth AND gates. An enabling signal to be discussed subsequently is provided to the fifth AND gate. The fourth AND gate drives a third NOR gate 334c and the fifth AND gate drives a fourth NOR gate 334d. The output of the fourth NOR gate is cross connected to the input of the third NOR gate and the output of the third NOR gate is cross connected to the input of the fourth NOR gate. The third NOR gate and fourth NOR gate drive a normal and inverting input respectively of a sixth AND gate 336 to enable transmission of the CLK2 signal through output 336a. The CLK2 signal is then transmitted as the clock output CLKOUT through OR gate 331.

The enable signals mentioned previously for the first NOR flip-flop and second NOR flip-flop, provided through the second AND gate and fifth AND gate respectively, prevent overlapping of the CLK1 and CLK2 signals by precluding enablement of a clock until the other clock is disabled. For the CLK1 signal, this is accomplished through a sixth flip-flop 340 driven by the fourth NOR gate 334d. A seventh flip-flop 342 is in turn driven by the sixth flip-flop. Both the sixth and seventh flip-flop are clocked by the CLK1 signal to synchronize the enable signal with the first clock. The inverting output of the seventh flip-flop provides the enable signal to the second AND gate of the first NOR flip-flop 328. The enable for the second NOR flip-flop 334 is provided through an eighth flip-flop 344 driven by the first NOR gate 328c. A ninth flip-flop 346 is driven in turn by the eighth flip-flop. Both the eighth and ninth flip-flop are clocked by the CLK2 signal to synchronize the enable signal with the second clock. The output of the ninth flip-flop is provided to the fourth AND gate 334b of the second NOR flip-flop 334 as the enabling signal.

Sensing of the clock signals to determine if the selected clock is in fact providing the CLKOUT signal is accomplished using a third NOR flip-flop 348. A seventh AND gate 348a is driven by the first NOR gate 328c and the fourth NOR gate 334d. An eighth AND gate 348b is driven by the second NOR gate 328d and the third NOR gate 334c. A fifth NOR gate 348c is driven by the seventh AND gate and a sixth NOR gate 348d is driven by the eighth AND gate. The third NOR flip-flop will only change state when the currently enabled clock is disabled and the other clock is enabled and functioning. The sixth NOR gate provides a signal denoting the active clock and drives a latch 350 enabled through input 352. The ACTIVE signal is obtained from the latch on output 354 by providing a READ signal on input 356. The READ signal additionally enables a driver 358 to read the first flip-flop 312. Comparison of the SELECT signal originally provided to the first flip-flop and the ACTIVE signal from the latch provides verification of the operation of the selected clock.

Those skilled in the art will recognize that the synchronizers, NOR flip-flops, and enabling circuits may be duplicated and cascaded to control a plurality of clocks.

A RESET signal is provided on input 358. In the embodiment shown the reset signal places the logic in a predetermined state for enabling the first clock. The RESET signal is provided to the first, fourth, fifth, eighth and ninth flip-flops and the second and third NOR gates. A low logic level or zero signal is provided to the second, third, sixth and seventh flip-flops. Asserting RESET will thereby provide a synchronized selection signal and enable signal to the first NOR flip-flop 328 after two pulses of the first clock. The CLK1 signal is immediately enabled and the CLK2 signal immediately disabled upon assertion of the reset signal through the second and third NOR gates respectively.

Figure 4A:
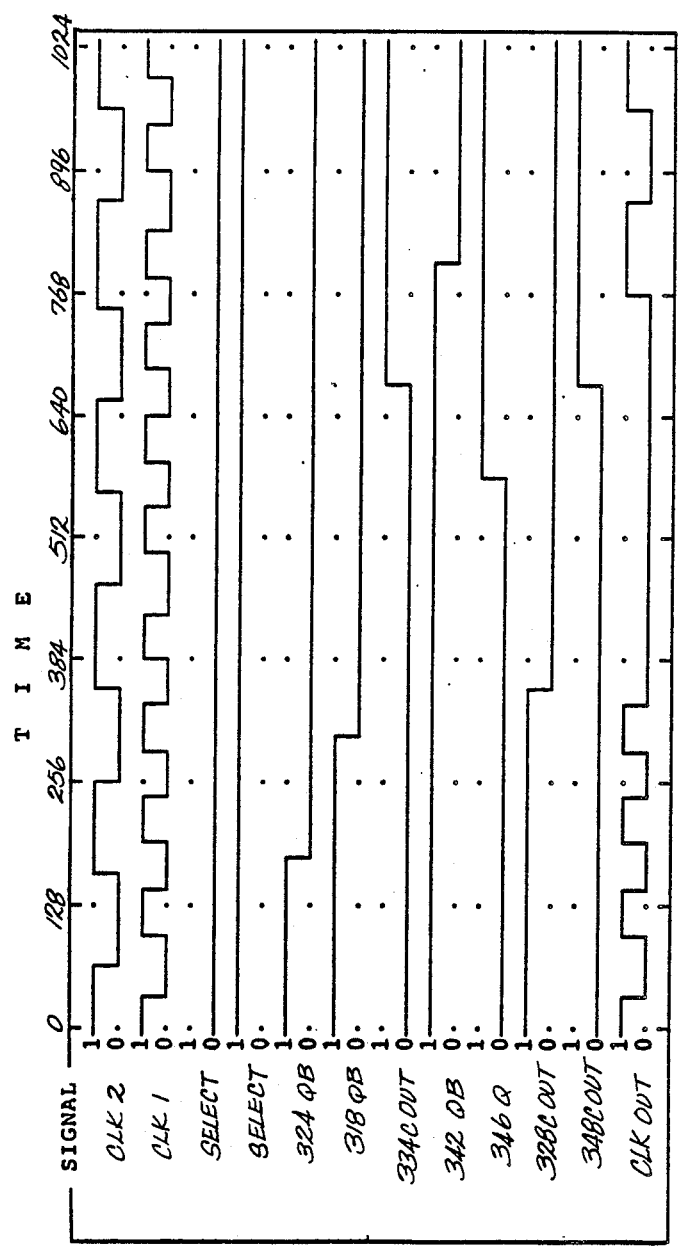
FIG. 4a is a timing diagram showing signal outputs for the various sub-circuits in response to a reset command.

Operation of the preferred embodiment is best described with reference to the timing diagrams shown in FIGS. 4a, 4b, and 4c. FIG. 4a provides the timing sequence for switching from the first clock to the second clock. The SELECT signal on input 310 is brought to a logic level zero designating the second clock. A WRITE strobe on input 314 clocks the select signal into the first flip-flop 312. The select signal for clock two and the corresponding deselect signal for clock one are now present on the output and inverting output of flip-flop 312. On the next falling edge of the CLK1 signal, the clock one deselect signal is clocked into the second flip-flop 316. On the second falling edge of CLK1, the third flip-flop 318 is clocked to synchronously provide the clock one deselect signal to the first NOR flip-flop 328 shown by trace 318QB.

The clock two select signal is clocked into the fourth flip-flop 322 on the first subsequent falling edge of CLK2. With the second falling edge of CLK2 the fifth flip-flop 324 synchronously provides the clock two select signal to the second NOR flip-flop 334 shown by trace 324QB.

The first NOR flip-flop responds to the clock one deselect changing state, as shown by trace 382c art and providing a clock one disabled signal to the third NOR flip-flop 348 and an enable signal to the eighth flip-flop 344. On the second subsequent falling edge of CLK2, the ninth flip-flop 346 synchronously provides the enable signal to the second NOR flip-flop, as shown by trace 346Q. The second NOR flip-flop now changes state, as shown by trace 334c out enabling the fifth AND gate 336, thereby causing transmission of clock CLK2, as shown by the CLKOUT trace. Additionally, the change of state of the second NOR flip-flop subsequent to the change of state of the first NOR flip-flop causes a change of state in the third NOR flip-flop reflecting clock two enabled and active, shown by trace 384c out. Assertion of the enable signal on input 352 latches the output of the third NOR flip-flop into the latch 350. Subsequent assertion of a read signal on input 354 provides the active signal demonstrating clock two in operation and a readout of the clock two select signal asserted at the first flip-flop through driver 356.

Figure 4B:
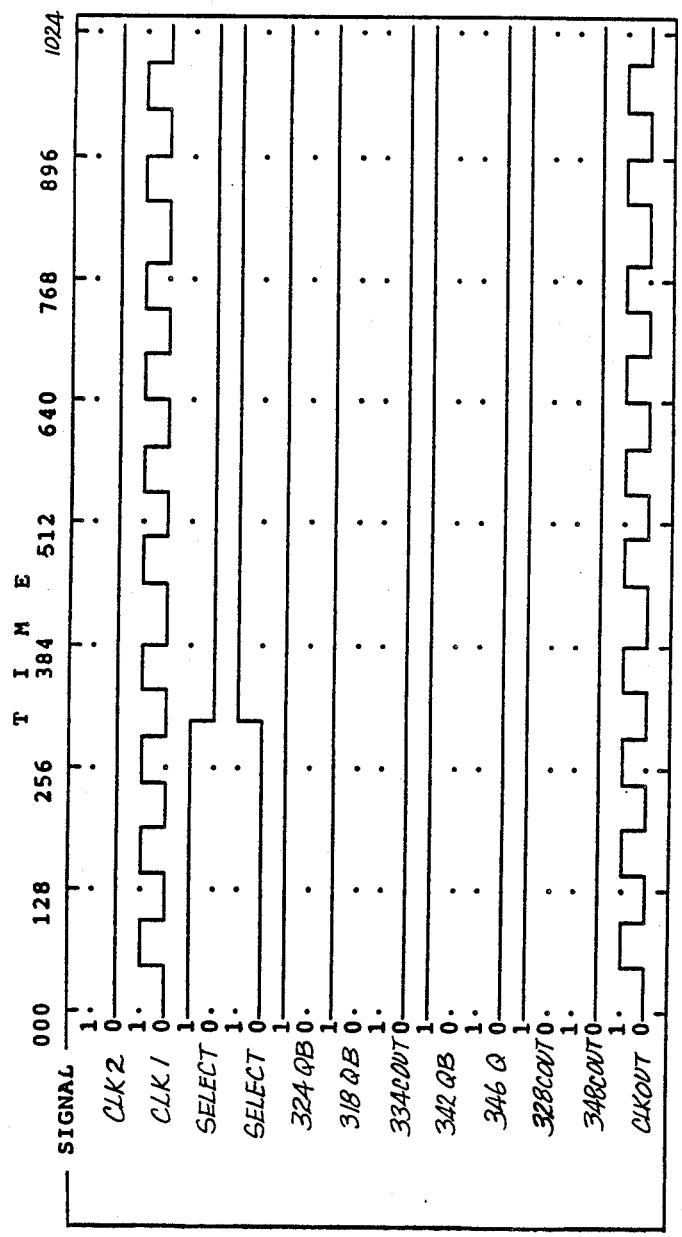
FIG. 4b is a timing diagram showing the phase relationship of the output signals in response to a select clock 2 command.

If the second clock was inoperative, the timing as shown in FIG. 4b would be present. Lack of a CLK2 signal prevents the enable signal from the change of state of the first NOR flip-flop from reaching the second NOR flip-flop. Additionally, no CLK2 signal is received directly by the second NOR flip-flop; therefore no change of state occurs, as shown by trace 334c out. The third NOR flip-flop responding to no output from the second NOR flip-flop also does not change state, as shown by trace 384c out. Therefore, the active signal received by the latch 350 will reflect clock one as the active clock. Comparison of the ACTIVE signal and the SELECT signal upon assertion of a READ at input 354 will reflect the lack of an active second clock. Absence of CLK2 also prevents the fourth and fifth flip-flops from changing state, as shown by trace 324QB. Therefore, the input to NAND gate 315 will not go true, and the second and third flip-flops will not change state, as shown by trace 318QB which maintains CLK1 as the clock output, as shown on trace CLKOUT.

Figure 4C:
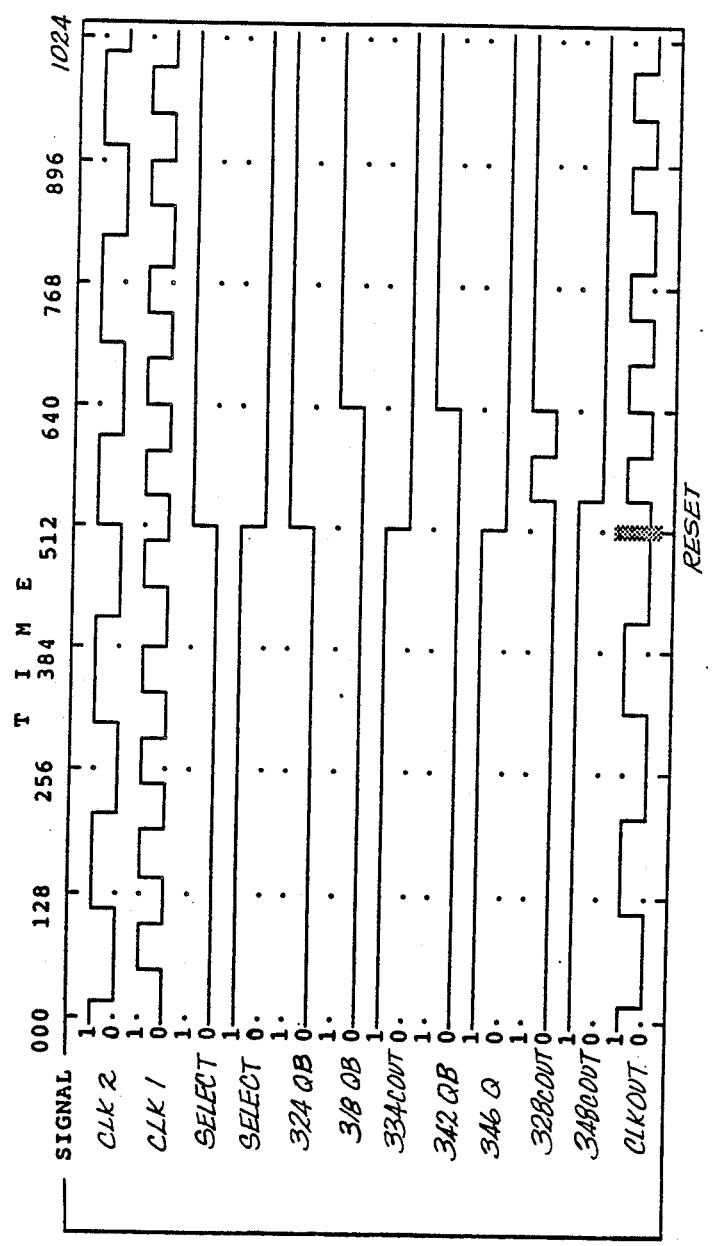
FIG. 4c is a timing diagram showing the phase relationship of the output signals of the various circuits after a clock switch command with no clock present.

FIG. 4c demonstrates the assertion of a reset signal on input 358 thereby placing the synchronizer and delay logic in a predetermined state, thereby enabling the first clock and disabling the second clock.

Having now described the invention in detail in accordance with the requirements of the patent statutes, those skilled in this art will have no difficulty in making changes and modifications in the individual circuits or their relative connection in order to meet specific requirements or conditions. Such changes and modifications may be made without departing from the scope and spirit of the invention as set forth in the following claims.

What is claimed is:

1. A clock switching circuit for selectively enabling first and second clocks comprising
   means for selecting the first or second clock, the selection means having a selection signal output;
   first means for synchronizing the selection signal output to the first clock;
   second means for synchronizing the selection signal output to the second clock;
   a first lock-out circuit having a first input responsive to the first synchronizer means; a second input responsive to the first clock, a third enabling input and an output providing a first clock enable signal;
   a second lock-out circuit having a first input responsive to the second synchronizer means; a second input responsive to the second clock; a third enabling input and an output providing a second clock enabling signal;
   a first delay circuit responsive to the second clock driven by the output of the first lockout circuit and having an output connected to the third input of the second lockout circuit; and,
   a second delay circuit responsive to the first clock driven by the output of the second lockout circuit and having an output connected to the third input of the first lockout circuit.

2. A clock switching circuit as defined in claim 1 further comprising:
   a sensor means for determining the enabled clock connected to the first lock-out circuit and second lock-out circuit;

3. A clock switching circuit as defined in claim 1 wherein each synchronizer means comprises at least two serially connected D-type flip-flops.

4. A clock switching circuit as defined in claim 1 wherein each lock-out circuit comprises a NOR flip-flop.

5. A clock switching circuit as defined in claim 1 wherein each delay circuit comprises at least two serially connected D-type flip-flops.

6. A clock switching circuit as defined in claim 1 further comprising means for resetting the selection means, first and second synchronizing means, first and second lock-out circuits, and first and second delay circuits to a predetermined state thereby selectively enabling the first clock as a default setting.

* * * * *